(12) United States Patent
Ibn Seddik et al.

(10) Patent No.: US 9,417,311 B2
(45) Date of Patent: Aug. 16, 2016

(54) METHOD AND DEVICE FOR PHASE-BASED LOCALIZATION OF A TARGET DEVICE USING INTERVAL ANALYSIS

(71) Applicant: CGG SERVICES SA, Massy (FR)

(72) Inventors: Mohamed Saad Ibn Seddik, Brest (FR); Luc Jaulin, Brest (FR)

(73) Assignee: CGG SERVICES SA, Massy (FR)

( * ) Notice: Subject to any disclaimer, the term of this patent is extended or adjusted under 35 U.S.C. 154(b) by 0 days.

(21) Appl. No.: 14/786,192

(22) PCT Filed: May 7, 2014

(86) PCT No.: PCT/EP2014/059393
§ 371 (c)(1),
(2) Date: Oct. 22, 2015

(87) PCT Pub. No.: WO2014/180930
PCT Pub. Date: Nov. 13, 2014

(65) Prior Publication Data
US 2016/0061930 A1    Mar. 3, 2016

Related U.S. Application Data

(60) Provisional application No. 61/820,303, filed on May 7, 2013.

(51) Int. Cl.
*G01V 1/38* (2006.01)
*G01S 3/808* (2006.01)

(52) U.S. Cl.
CPC ............... *G01S 3/808* (2013.01); *G01S 3/8086* (2013.01); *G01V 1/3835* (2013.01)

(58) Field of Classification Search
CPC ...... G01S 3/8086; G01S 3/808; G01V 1/3835
See application file for complete search history.

(56) References Cited

U.S. PATENT DOCUMENTS

| | | | | |
|---|---|---|---|---|
| 6,819,984 | B1 * | 11/2004 | Bedckman | G01C 21/00 367/124 |
| 2011/0038230 | A1 | 2/2011 | Napolitano et al. | |
| 2011/0090762 | A1 | 4/2011 | Rhodes et al. | |
| 2012/0243375 | A1 * | 9/2012 | Melvin, II | G01S 3/8083 367/127 |

OTHER PUBLICATIONS

International Search Report in related International Application No. PCT/EP2014/059393, mailed Oct. 22, 2014.
Written Opinion of the International Searching Authority in related International Application No. PCT/EP2014/059393, mailed Oct. 22, 2014.

* cited by examiner

*Primary Examiner* — Krystine Breier
(74) *Attorney, Agent, or Firm* — Patent Portfolio Builders PLLC

(57) ABSTRACT

Location of underwater moving target device carrying a receiver configured to detect acoustic waves emitted at a known location is estimated such that to be consistent with detected velocity and orientation of the target device, and with a current phase of a signal corresponding to the acoustic waves detected at the target device. A stack including one or more boxes obtained by applying contractors to location boxes is output as the estimate of the location of the moving target device.

20 Claims, 9 Drawing Sheets

METHOD AND DEVICE FOR PHASE-BASED LOCALIZATION OF A TARGET DEVICE USING INTERVAL ANALYSIS

CROSS REFERENCE TO RELATED APPLICATIONS

This application claims priority and benefit from U.S. Provisional Patent Application No. 61/820,303, filed May 7, 2013, for "Phase-based Localization Using Interval Analysis," the entire content of which is incorporated in its entirety herein by reference.

BACKGROUND

1. Technical Field

Embodiments of the subject matter disclosed herein generally relate to methods and devices used for estimating a location of a target device moving through water and carrying a receiver that detects waves emitted by a source at a known location, and, more particularly, to using interval analysis based on the phase of the detected wave to estimate the location of the target device.

2. Discussion of the Background

Autonomous underwater vehicles (AUVs) are unmanned underwater vehicles (i.e., robots) often used in the oil and gas industry, for example, to perform tasks related to equipment used in marine seismic surveys. For example, AUVs may be used to remove marine growth that becomes attached to birds mounted on streamers. The AUV's may also be used for collecting seismic data.

Since they are moving underwater, AUVs positions cannot be determined based on Global Positioning System signals. Therefore, an AUV navigates using an underwater acoustic positioning system based on detecting waves generated by sources at known positions. If the waves are generated at more than one known position, the AUV's position may be determined by triangulation. However, during marine seismic surveys, waves may be generated from a single location (e.g., a source attached to the vessel towing the streamer). In these circumstances, effectively determining a moving AUV's location becomes more difficult (imprecise or time-consuming), impinging on the AUV's operability.

Accordingly, it would be desirable to provide devices and methods for quickly and effectively determining the position of an underwater AUV, i.e., fast enough and with a precision that would not impede its operation.

SUMMARY

Location of a target device moving through water and carrying a receiver detecting waves emitted at a known location is estimated based on the phase of a received signal and some other path-related attributes.

According to an embodiment, there is a method for estimating a location of a target device moving underwater and carrying a receiver configured to detect acoustic waves emitted at a known location. The method includes measuring, at a first time, a velocity of the target device, an orientation of the target device and a signal corresponding to the acoustic waves emitted at the known location and detected at the target. The method further includes generating one or more location boxes that include the location of the target device at the first time. Then, for each of the location boxes, at least one contractor such that a contracted box meets constraints according to the velocity, the orientation and a phase of the signal. If the width of the contracted box is less than a predetermined localizing precision, the contracted box is placed in a stack of boxes, otherwise the contracted box is split into two location boxes which are then placed in the stack. The method further includes outputting the stack of boxes as an estimate of the location of the target device at the first time.

According to another embodiment, there is a method for tracking an underwater moving target device that detects signals due to acoustic waves generated at a known location. The method includes obtaining path and signal related attributes at the underwater moving target device, for a series of times. The method then includes, for each of the times, repeatedly contracting one or more location volumes that include a current location of the underwater moving target device, in a manner consistent with the obtained attributes.

According to yet another embodiment, there is an apparatus for estimating a location of an underwater moving target device carrying a receiver configured to detect acoustic waves emitted at a known location. The apparatus has an interface configured to receive information about a velocity of the underwater moving target device, an orientation of the underwater moving target device and a signal corresponding to the acoustic waves as detected at the underwater moving target device. The apparatus further includes a data processing unit configured to generate one or more location boxes that include the location of the underwater moving target device, and, for each of the location boxes, (A) to apply at least one contractor such that a contracted box to meet constraints according to the velocity, the orientation and a phase of the signal, and, (B) if the width of the contracted box is less than a predetermined localizing precision, to place the contracted box in a stack of boxes, otherwise to split the contracted box into two location boxes and to place the two location boxes in the stack. The data processing unit is further configured to output the stack of boxes as an estimate of the location of the underwater moving target device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an AUV configured to record acoustic signals. However, the embodiments to be discussed next are not limited to AUVs, but may be applied to other manned or unmanned moving target devices and to electromagnetic waves or others.

Figure 1:
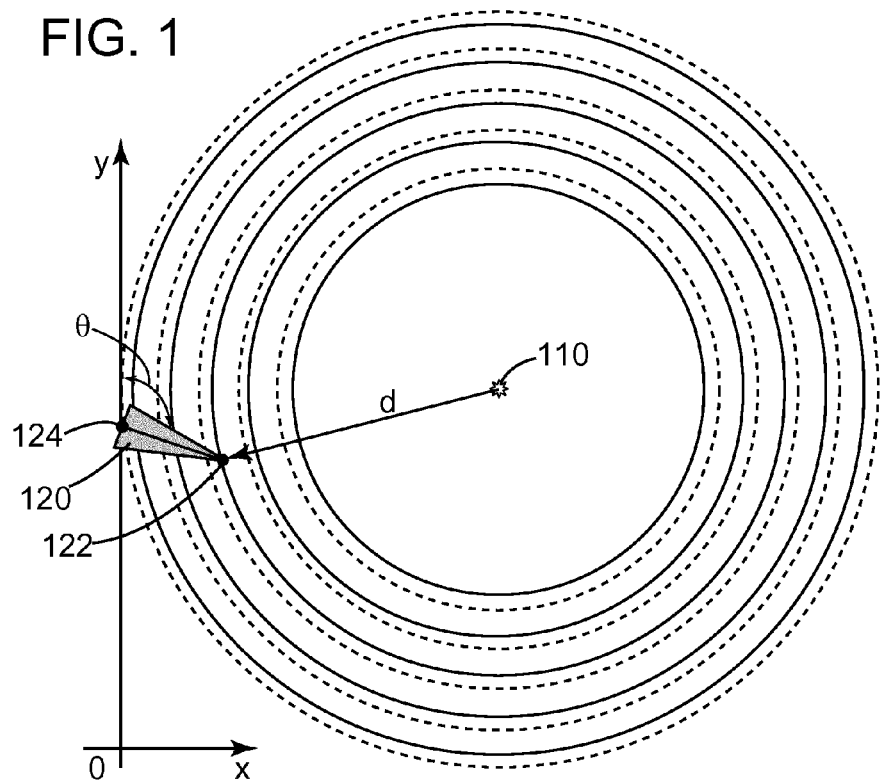
FIG. 1 illustrates the problem of locating a target device.

FIG. 1 illustrates the problem facing AUV operators: determining the location of an AUV in motion, fast enough and with a precision that would not impede its operation. A single wave source 110 at known of coordinates emits waves detected by the receiver(s) located on the AUV. AUV 120 is represented as a triangle having one receiver 122 on a corner (vertex) and another receiver 124 on its base (receiver 122 is known as a "head receiver" and receiver 124 as a "tail receiver"). Having two receivers is not necessary, but useful for the illustration. The triangular shape also suggests that AUV 120 is moving along a direction defined by a line formed by the receivers. This direction has a measurable orientation θ relative to a reference coordinate system x0y (i.e., having orthogonal axes 0x and 0y).

Both receivers 122 and 124 detect a signal corresponding to the waves emitted by wave source 110. Based on the phase delay of the respective signal (i.e., current respective sample thereof), receiver 122 can be located on any of the full-line circles and receiver 124 can be located on any of the dashed-line circles. Note that not all possible circles and not all their full circumferences are illustrated in FIGS. 1-5 (which are meant to be illustrative and not exhaustive).

Figure 2:
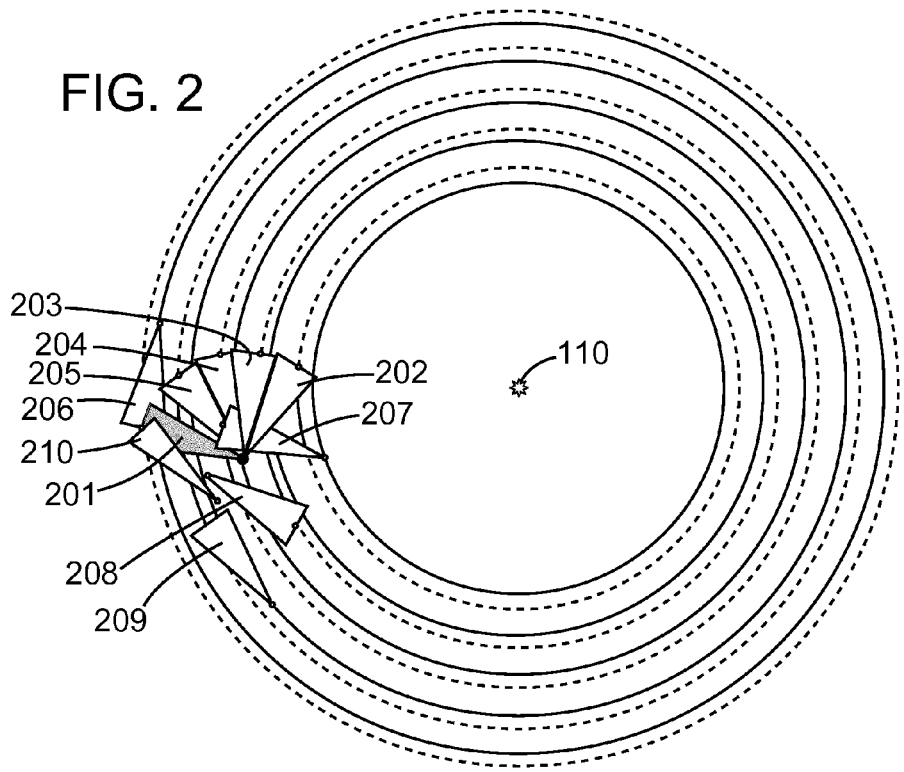
FIG. 2 illustrates possible positions of the target device determined using only phase delay.

As illustrated in FIG. 2, if phase delay is the only information available, the actual position 201 (darker) of the AUV is hard to distinguish from the many other possible positions 202-210 (only some of the possible positions are represented in this figure).

Figure 3:
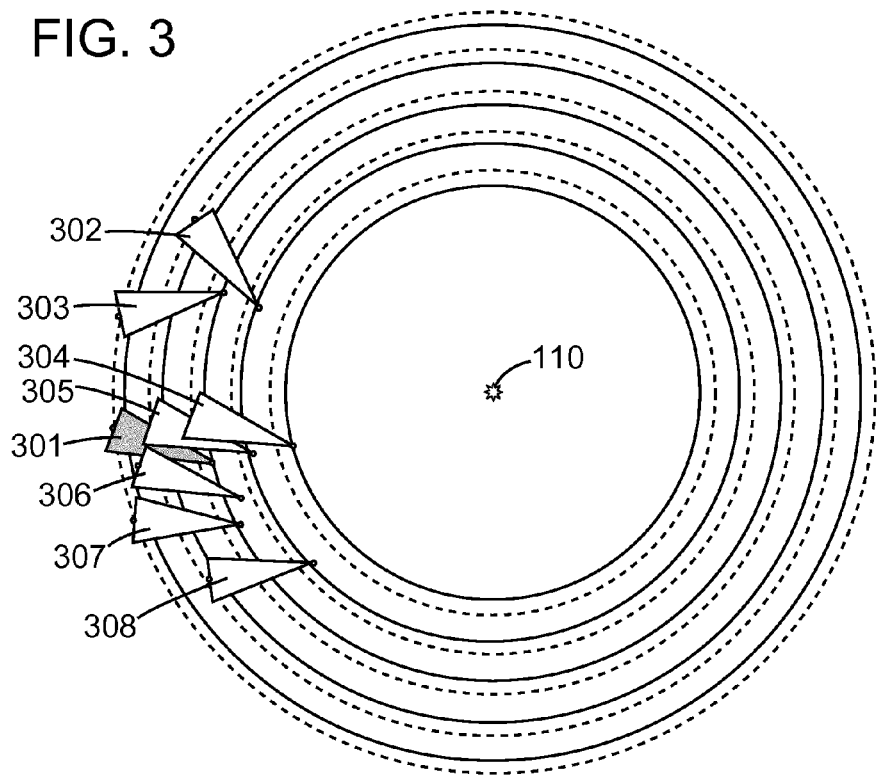
FIG. 3 illustrates possible positions of the target device determined using only time delay of arrival between two receivers on the target.

As illustrated in FIG. 3, if only time delay of arrival between the two receivers is used, the actual position 301 (darker) is also hard to distinguish from other possible positions 302-310 (again, only some of the possible positions are represented).

Figure 4:
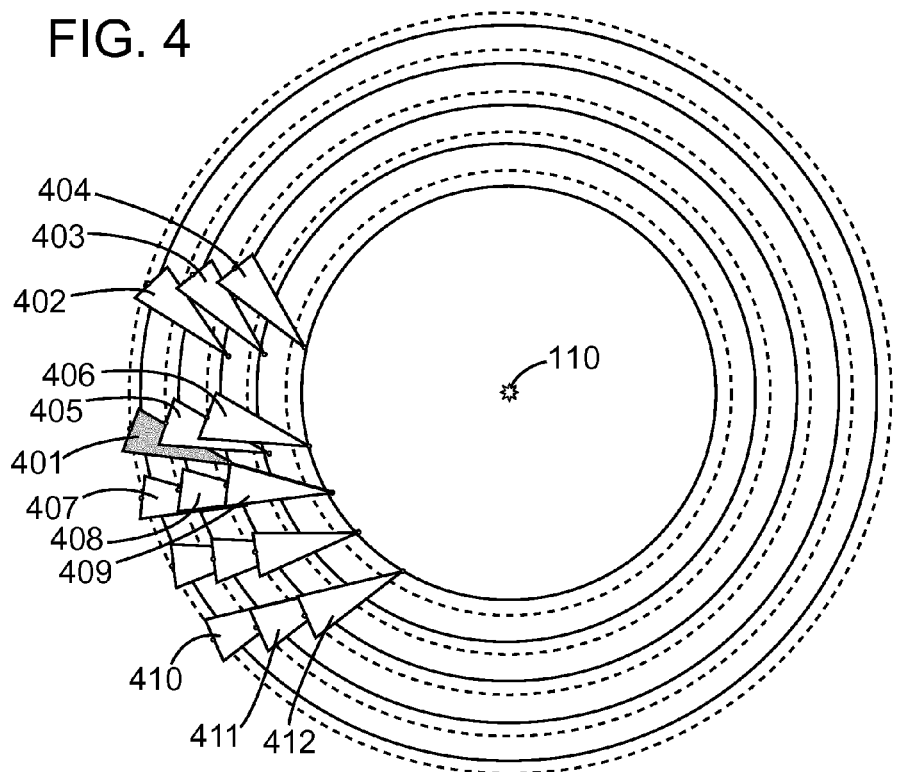
FIG. 4 illustrates possible positions of the target device determined using phase delay and time delay.

However, if both phase delay and time delay are used, the number of possible positions 401-410 decreases (401 being the actual position), as illustrated in FIG. 4. Note that the possible positions are now grouped (e.g., 402-403-404, 401-405-406, etc.), AUVs' positions in the same group being parallel to each other.

Figure 5:
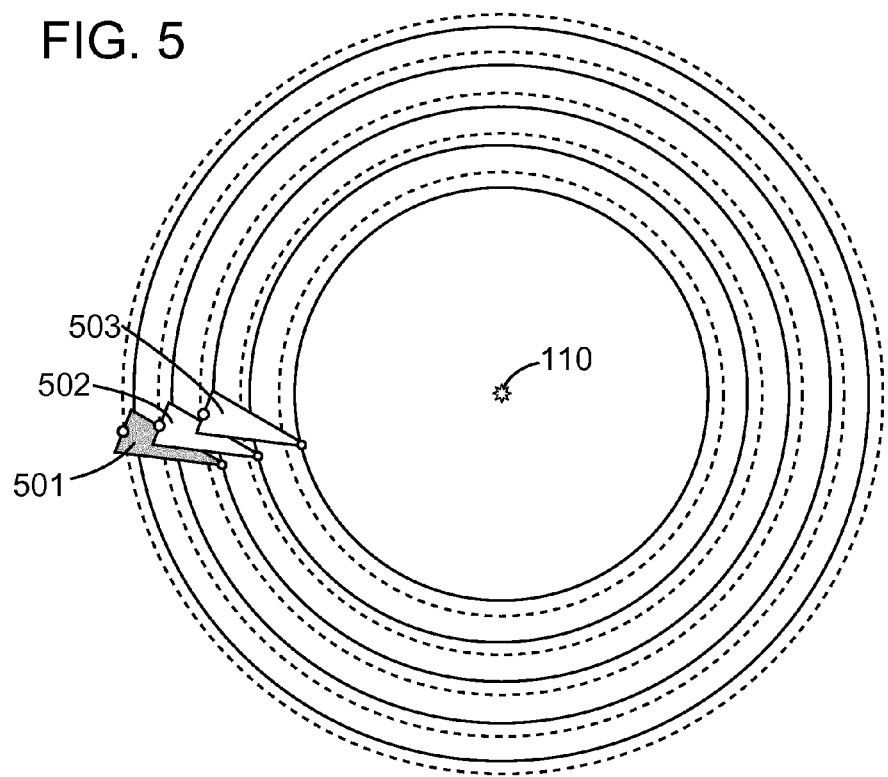
FIG. 5 illustrates possible positions of the target device determined using phase delay, time delay and orientation.

Finally, as illustrated in FIG. 5, according to an embodiment, when phase delay, time delay and orientation are used, the number of possible positions further decreases to a manageable/meaningful set (501 represents the actual position, and 502 and 503 are other possible positions).

According to some embodiments, a target's location (e.g., AUV's location) is determined by volume contraction. In order to explain location volume contraction, consider a contractor as being a mapping $\mathcal{C}$ from $R^n$ to $R^n$ such that for any initial set of points [x] in $R^n$ the contracted set, $\mathcal{C}([x])$ is included in the initial set of points [x]. As an operator, the contractor is characterized by consistency and continuity. Consistency means that if a subset of points included in an initial set of points is equal to its contracted subset (i.e., is unchanged by applying the contractor), then the subset is included in the contracted initial set. Continuity means that if the result of applying the contractor to a set of points is null (i.e., no points in the contracted set), than there is a minimum radius $\epsilon$ such that a contractor applied to spheres of radius $\epsilon$ centered on the points in the set would also be null. In other words, if the result of applying the contractor to a set of points is null, no point in this set of points is adjacent to another point in the set.

Figure 6:
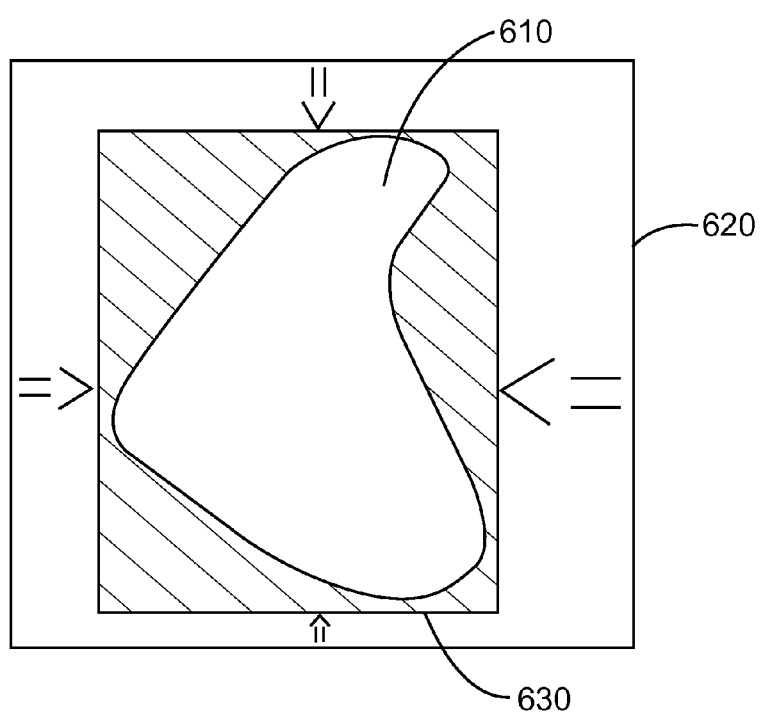
FIG. 6 illustrates volume contraction.

Volume contraction is exemplarily illustrated in FIG. 6. An area of interest 610 is located inside an initial box 620. By applying a contractor (as suggested by the arrows), initial box 620 is replaced by a contracted box 630. Contracted box 630 is included in (and thus smaller than) initial box 620 and it still includes area of interest 610.

Figure 7:
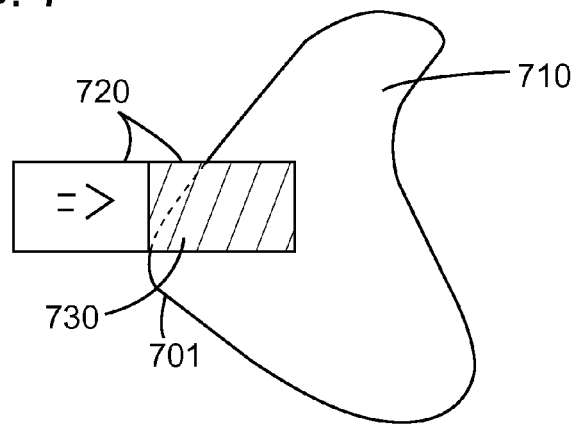
FIG. 7 illustrates an outer contractor.

In another example illustrated in FIG. 7, volume contraction is used for locating a boundary 701 of an area of interest 710, inside an initial box 720. By applying a contractor (as suggested by the arrow), initial box 720 is replaced by a contracted box 730. Contracted box 730 is included in (and thus smaller than) initial box 720, and it still includes boundary 701. When the contractor eliminates an area outside the area of interest, the contractor is named "outer contractor."

Figure 8:
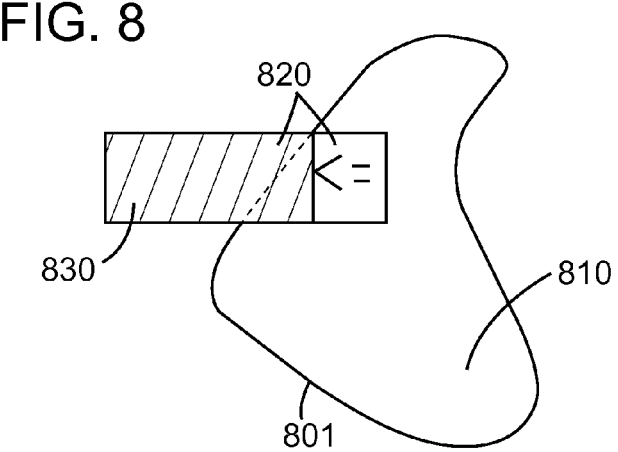
FIG. 8 illustrates an inner contractor.

In yet another example illustrated in FIG. 8, the problem is also locating a boundary 801 of an area of interest 810, inside an initial box 820. By applying a contractor (as suggested by the arrow), initial box 820 is replaced by a contracted box 830. Contracted box 830 is included in (and thus smaller than) initial box 820 and it still includes boundary 801. When the contractor eliminates an area inside the area of interest, the contractor is named "inner contractor."

Returning now to FIG. 1, if wave source 110 located at coordinates $(b_x, b_y)$ emits waves of frequency f, a receiver located at coordinates $(p_x, p_y)$ (i.e., at a distance d from wave source 110) detects a signal $$s = \sin\left(2\pi f\left(t - \frac{d}{c}\right)\right),$$

where t is time and c is wave propagation velocity through water. The distance from the wave source to the receiver is $d = \sqrt{(p_x - b_x)^2 + (p_y - b_y)^2}$.

If the receiver moves with a velocity v in a direction e, then the time derivatives of the receiver's coordinates are $$\frac{dp_x}{dt} = v\cos\theta, \text{ and}$$

$$\frac{dp_y}{dt} = v\sin\theta.$$

The above equations and signal dependence of time formulate the phase localization problem. Solving the localization problem means finding $(p_x, p_y)$ consistent with measured v, θ and s. In fact, since the signal is sampled (at a known time interval dt) for two successive times k and k+1, the equations have the discrete form:

$$p_{x,k+1} = p_{x,k} + dt * v_k \cos\theta_k$$

$$p_{y,k+1} = p_{y,k} + dt * v_k \sin\theta_k$$

$$s_k = \sin\left(2\pi f\left(t - \frac{\sqrt{(p_{x,k} - b_x)^2 + (p_{y,k} - b_y)^2}}{c}\right)\right)$$

Figure 9:
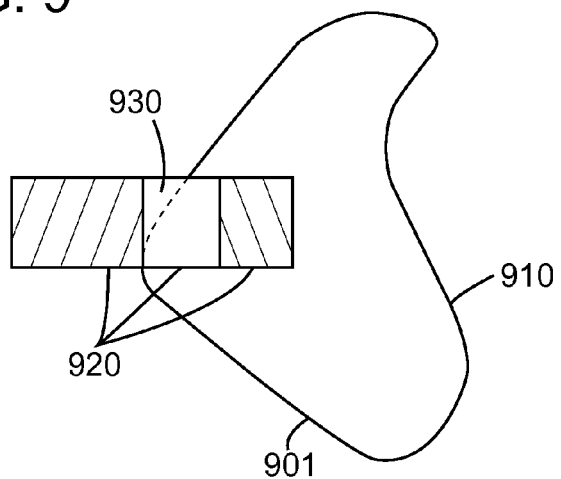
FIG. 9 illustrates use of both an inner contractor and an outer contractor to determine a boundary.

Solving this problem by inverting or linearizing the equations is tedious and takes a relatively long time. Inner contractors and outer contractors may be used alternatively to contract the location volume. For example, FIG. 9 illustrates using an inner contractor and an outer contractor to contract an initial box 920 thereby obtaining a contracted box 930 including boundary 901 of area 910.

Although theoretically either or both an inner contractor and an outer contractor may be applied, for the practical problem sought to be solved (i.e., determining volumes including location of the AUV), an outer contractor is preferably used.

Thus, contractors may be applied to estimate a location of a target device carrying a receiver configured to detect waves emitted at a known location. Specifically, an outer contractor is applied to determine a box smaller than the initial location box and including the solutions of the equations. An inner contractor may be used to determine a box smaller than the initial location box that does not include most solutions of the equations.

A pseudo-code illustrating a method using contractors according to an embodiment is set forth next.

```
push initial_box to stack;
while (stack not empty){
    pop box from stack;
    contract box;
    if (box's width > precision){
        split box into two boxes;
        push boxes to stack;
    }
}
```

Thus, in each location box are plural possible positions. Exact determination of the AUV's position is not required. This method may be used to track a moving AUV (it is ineffective if the AUV is stationary). The method is also inefficient if the velocity of the AUV is less than a threshold (e.g., 1 m). If the AUV moves along a straight line, an ambiguity is injected (due to the periodicity of the trigonometric functions) and two location boxes symmetrical relative to the wave source's location are needed. This ambiguity is resolved as soon as the AUV changes its moving direction.

As illustrated in FIG. 5, plural positions (maybe even a very large number) are possible. Whenever the AUV changes its moving direction, the number of possible positions decreases abruptly. As the AUV moves and new samples of the detected signal are acquired, the AUV location is better defined. Few contracting steps may be applied for each sample.

The AUV's trajectory may be reconstructed based on possible positions in successive sampling intervals. In fact, plural possible trajectories are built by following successive possible positions.

Figure 10:
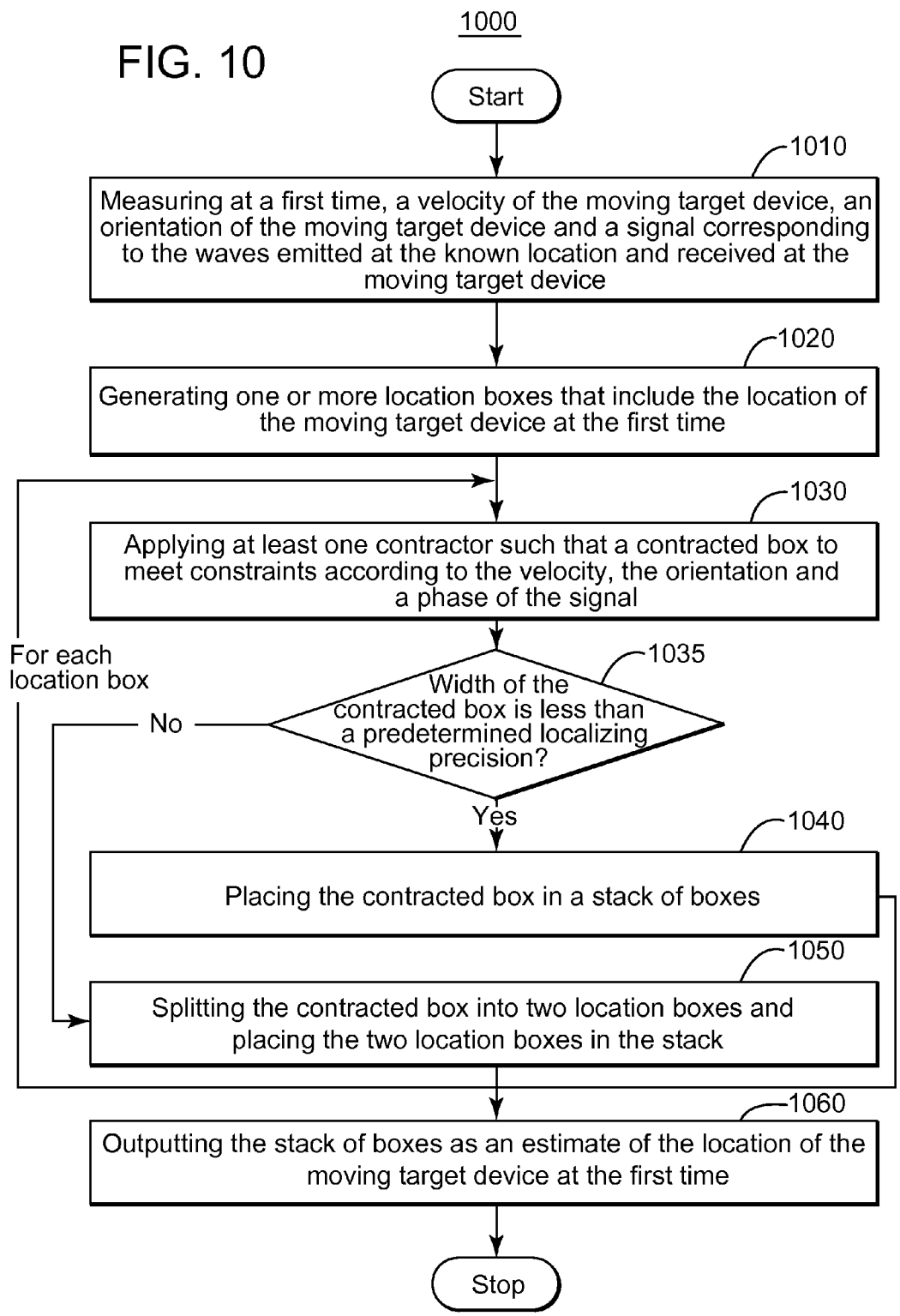
FIG. 10 is a flowchart of a method for estimating a location of a target device moving underwater and carrying a receiver configured to detect waves emitted at a known location, according to an embodiment.

FIG. 10 illustrates a flowchart of a method 1000 for estimating a location of a target device moving underwater and carrying a receiver configured to detect acoustic waves emitted at a known location. Acoustic waves are often employed for underwater communication. Method 1000 includes measuring, at a first time, a target device's velocity and orientation, and a signal corresponding to the acoustic waves received at the target device, at 1010. Note that measuring the target device velocity and orientation may actually mean determining ranges (min/max) of velocity or angle values; the narrower the ranges the better is the location determined.

Method 1000 further includes generating one or more location boxes that include the location of the moving target device at the first time, at 1020. In principle, the whole space may be the initial box.

Method 1000 then includes operations performed for each of the one or more location boxes. At 1030, at least one contractor is applied to a location box to obtain a contracted box that meets constraints according to the velocity, the orientation and a phase of the signal. Coordinates of the known location, frequency of the waves and a wave propagation velocity between the known location and the moving target device may be used to determine the contracted box.

The relationship between the width of the contracted box and a predetermined localizing precision is tested at 1035. If width of the contracted box is less than a predetermined localizing precision (i.e., "Yes" branch of block 1035), the contracted box is placed in a stack of boxes at 1040. However, if width of the contracted box is not less than the predetermined localizing precision (i.e., "No" branch of block 1035), the contracted box is split into two location boxes at 1050.

Method 1000 then includes outputting the stack of boxes as an estimate of the location of the moving target device at the first time, at 1060.

Note that before outputting the stack of boxes, steps 1030 and 1040 may be repeated, the boxes in the stack at an end of one repetition being the location boxes used for performing a next repetition of these steps. The stack of boxes is output (A) when a number of repetitions becomes equal to a predetermined number, (B) none of the boxes in the stack is wider than the predetermined localizing precision or (C) a new signal corresponding to the acoustic waves is detected at the target device.

Frequency f of the waves and wave velocity c in water are used together with the measured velocity v of the target device, the orientation θ of the target device and a current sample of the signal s to contract a location box. The location (px,py) of the target device satisfies the following phase equations:

$$\frac{d(p_x)}{dt} = v\cos\theta, \tag{1}$$

$$\frac{d(p_y)}{dt} = v\sin\theta \tag{2}$$

$$s = \sin\left(2\pi f\left(t - \frac{\sqrt{(p_x - b_x)^2 + (p_y - b_y)^2}}{c}\right)\right). \tag{3}$$

Preferably, the boxes in the stack do not overlap. The waves may be acoustic waves with a frequency of 10 Hz to 70 KHz. The predetermined localizing precision may depend on the wave's frequency.

The above-described steps of method 1000 are related to the target device location at one (first) time. However, the method may further include (i) measuring, at a second time, after the first time, the velocity of the moving target device, the orientation of the moving target device and the signal, (ii) generating second location boxes that include the location of the moving target device at the second time, using the estimate of the location of the moving target device at the first time, and then, (iii) processing the second location boxes in a manner similar to steps 1030-1050. In other words, for each of the second location boxes, at least one second contractor is applied such that a second contracted box meets constraints according to the velocity, the orientation and a second phase of the signal corresponding to the second time. If width of the second contracted box is less than the predetermined localizing precision, the second contracted box is placed in a second stack of location boxes, otherwise the second contracted box is split into two location boxes which are then placed the two location boxes in the second stack. The second stack is then output as the estimate of the location of the moving target device at the second time.

Figure 11:
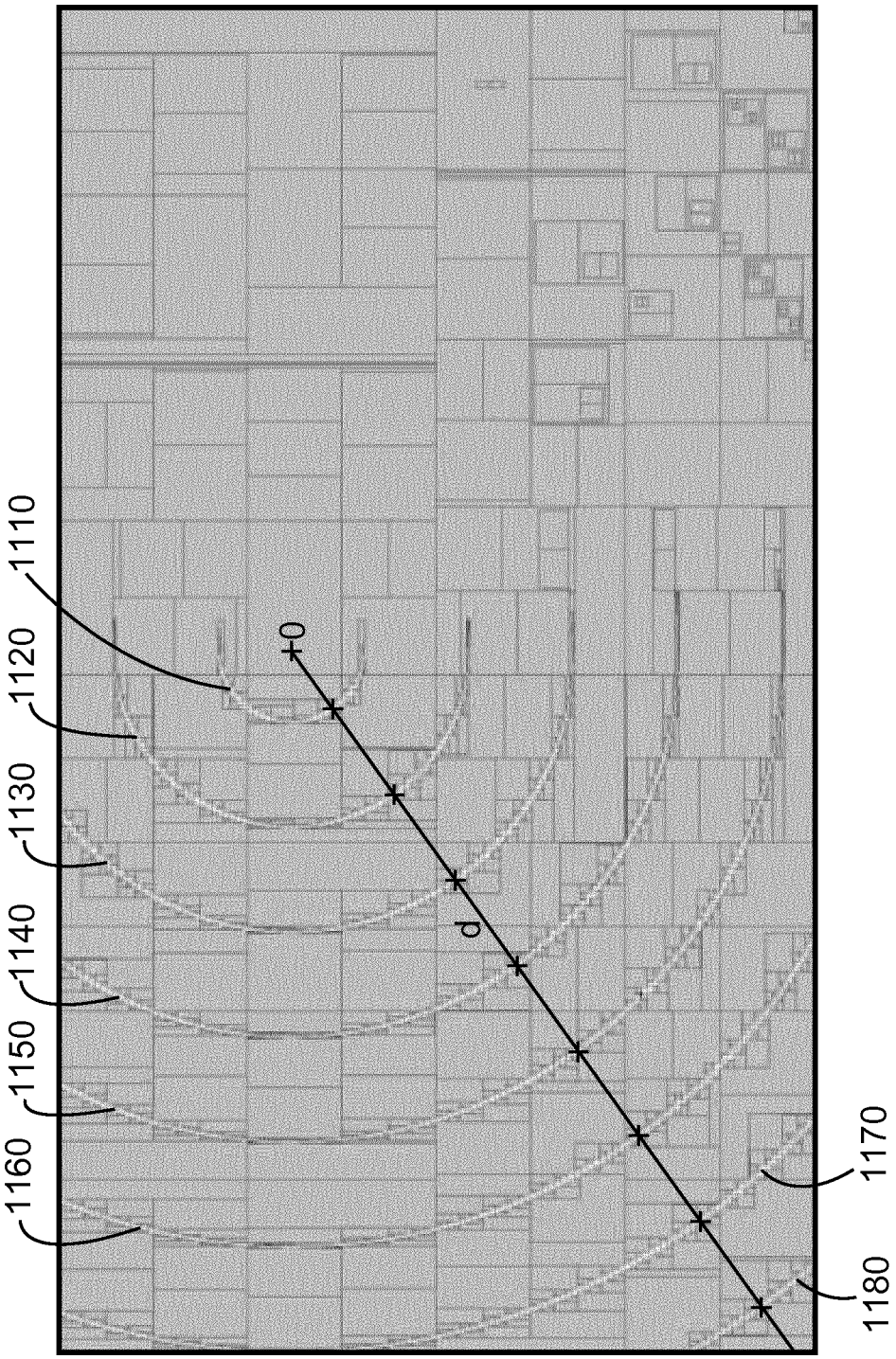
FIG. 11 illustrates a simulation of initial possible positions obtained using a method according to an embodiment.
Figure 12:
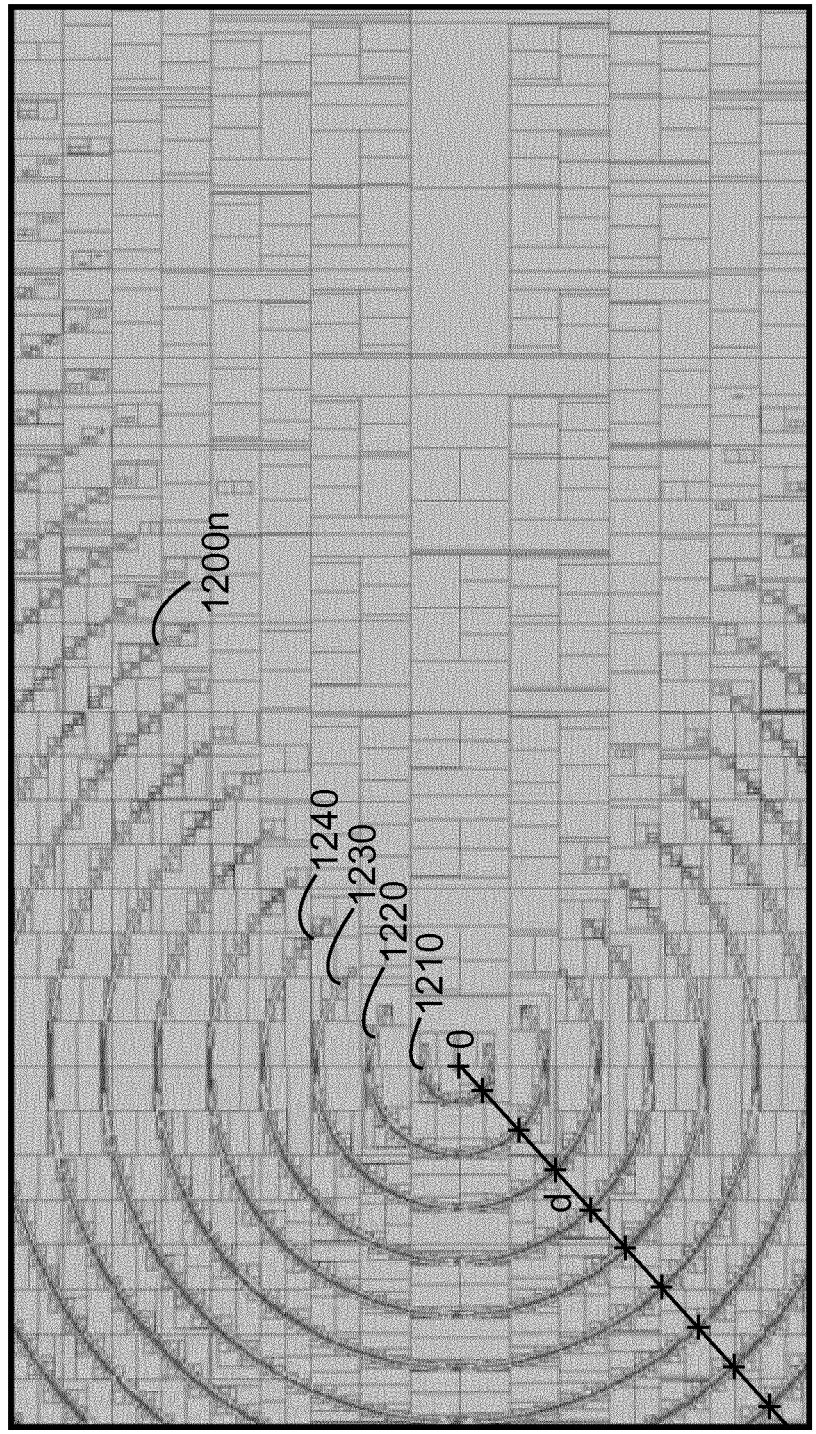
FIG. 12 illustrates another simulation of initial possible positions obtained using a method according to an embodiment.

FIG. 11 illustrates a simulation of initial possible positions for a signal frequency of 100 Hz, a sampling rate of 1 ms and a target velocity of 3 m/s, where O is the known location of the wave source. FIG. 12 illustrates a simulation of initial possible positions achieved for a signal frequency of 100 Hz, a sampling rate of 1 ms and a target velocity of 20 m/s, where O is the known location of the wave source. In these two dimensional illustrations, the contracted boxes (having a lighter shade) align on portions 1110-1150, and 1210-1240, 1200n (not all circles labeled in FIG. 12) of circles centered in O. The distance d between circles 1110-1180 along radii thereof depends on the signal's wavelength in the medium.

In one embodiment, waves of different frequencies may be emitted at the known wave source location (e.g., O in FIGS. 11 and 12). In this case, the determining step is performed using phases corresponding to both waves.

In one embodiment, electromagnetic waves emitted at the same location as the acoustic waves or at another location may also be detected at the target device. Although the electromagnetic waves are strongly attenuated in water, high frequency electromagnetic waves (e.g., between 10 MHz and 1 GHz) may be used if the electromagnetic source-to-receiver distances are tens of even hundreds of meters.

The AUV may carry a second receiver configured to detect the acoustic waves, the two receivers being mounted at different locations on the AUV. In this case, the determining step may be performed using phases of both signals detected by the two receivers (the signals corresponding to the acoustic waves emitted from the same location and thus having the same frequency). The location boxes shrink faster in this case (i.e., the solution converges faster).

The AUV's velocity may be measured using an odometer, a Doppler velocity log or sonar. The AUV's orientation may be measured using a compass, a magnetometer or an inertial measurement unit.

Figure 13:
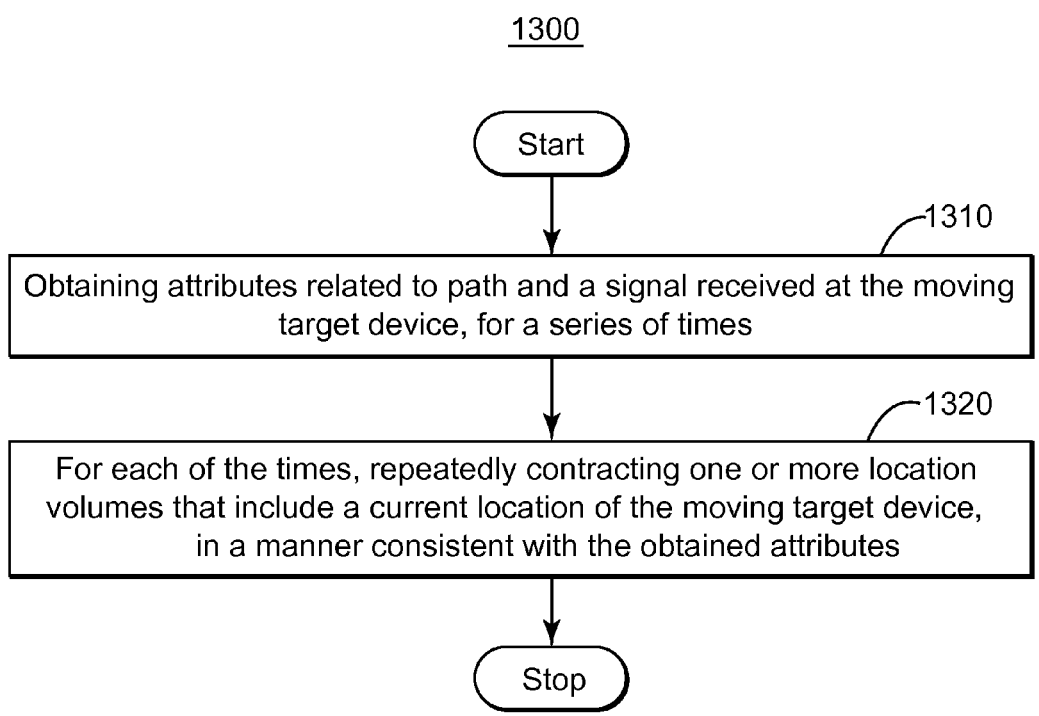
FIG. 13 is a flowchart of a method for estimating a location of a target device moving underwater and carrying a receiver configured to detect waves emitted at a known location, according to another embodiment.

FIG. 13 is a flowchart of a method 1300 for tracking an underwater moving target device that detects signals due to acoustic waves generated at a known location, according to another embodiment. Method 1300 includes obtaining attributes related to path and a signal received at the moving target device, for a series of times, at S1310. Method 1300 further includes, for each of the times, repeatedly contracting one or more location volumes that include a current location of the moving target device, in a manner consistent with the obtained attributes, at S1320.

Figure 14:
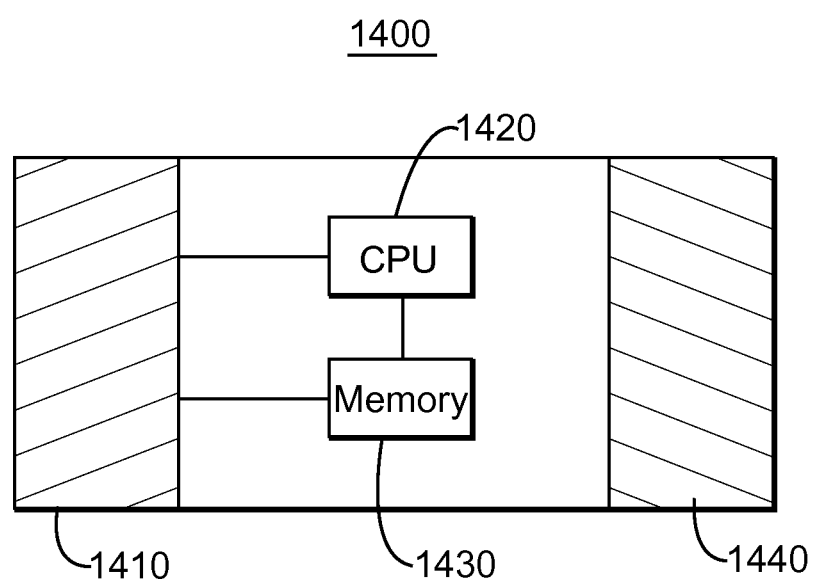
FIG. 14 is a schematic diagram of an apparatus for estimating a location of a target device moving underwater and carrying a receiver configured to detect waves emitted at a known location, according to another embodiment.

FIG. 14 illustrates an apparatus 1400 for estimating a location of an underwater moving target carrying a receiver configured to detect acoustic waves emitted at a known location. The apparatus may be located on the target device or remote (e.g., on the towing vessel). Apparatus 1400 includes an interface 1410 and a data processing unit 1420.

Interface 1410 is configured to receive information about a target's velocity and orientation and a signal corresponding to the acoustic waves detected at the moving target device. Data processing unit 1420 is configured to generate one or more location boxes that include the location of the moving target device, to process the location boxes placing the processed boxes in a stack of boxes and to output the stack of boxes as an estimate of the location of the moving target device. The processing of the location boxes includes, for each of each of the location boxes, (A) to apply at least one contractor such that a contracted box meets constraints according to the velocity, the orientation and a phase of the signal, and, (B) if width of the contracted box is less than a predetermined localizing precision, to place the contracted box in the stack of boxes, otherwise to split the contracted box into two location boxes and to place the two location boxes in the stack.

Apparatus 1400 may further include a memory 1430 configured to store data and software. Memory 1430 may store executable codes implementing methods according to any of the above-described embodiments and data buffers. Apparatus 1400 may further include a display 1440 enabling displaying an image of possible target locations.

The disclosed exemplary embodiments provide methods and devices for estimating location of a target device moving underwater and carrying a receiver configured to detect waves emitted at a known location. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element can be used alone without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for estimating a location of a target device moving underwater and carrying a receiver configured to detect acoustic waves emitted at a known location, the method comprising:

measuring, at a first time, a velocity of the target device, an orientation of the target device and a signal corresponding to the acoustic waves emitted at the known location and detected at the target device;

generating one or more location boxes that include the location of the target device, at the first time;

for each of the location boxes,
applying at least one contractor such that a contracted box meets constraints according to the velocity, the orientation and a phase of the signal, and
if a width of the contracted box is less than a predetermined localizing precision, placing the contracted box in a stack of boxes, otherwise splitting the contracted box into two location boxes and placing the two location boxes in the stack; and outputting the stack of boxes as an estimate of the location of the target device at the first time.

2. The method of claim 1, wherein steps of the method performed for each of the location boxes are repeated, the boxes in the stack at an end of one repetition being the location boxes used for performing a next repetition of the steps.

3. The method of claim 1, wherein, the stack of boxes is output when a number of repetitions equals a predetermined number, none of the boxes in the stack is wider than the predetermined localizing precision or a new signal corresponding to the acoustic waves is detected at the target device.

4. The method of claim 1, wherein the predetermined localizing precision depends on a frequency of the waves.

5. The method of claim 1, wherein the boxes in the stack do not overlap.

6. The method of claim 1, further comprising:
measuring, at a second time after the first time, the velocity of the target device, the orientation of the target device and the signal;
generating second location boxes that include the location of the target device at the second time, using the estimate of the location of the target device at the first time;
for each of the second location boxes,
applying at least one second contractor such that a second contracted box meets constraints according to the velocity, the orientation and a second phase of the signal corresponding to the second time, and
if a width of the second contracted box is less than the predetermined localizing precision, placing the second contracted box in a second stack of location boxes,
otherwise splitting the second contracted box into two location boxes and placing the two location boxes in the second stack; and
outputting the second stack as the estimate of the location of the target device at the second time.

7. The method of claim 1, wherein coordinates of the known location, frequency of the waves and a wave propagation velocity between the known location and the target device are used to determine the contracted box.

8. The method of claim 1, wherein the constraints include the location ($p_x$, $p_y$) of the target device to satisfy equations $$\frac{d(p_x)}{dt} = v\cos\theta,$$

$$\frac{d(p_y)}{dt} = v\sin\theta, \text{ and}$$

$$s = \sin\left(2\pi f\left(t - \frac{\sqrt{(p_x - b_x)^2 + (p_y - b_y)^2}}{c}\right)\right),$$

where t is time, v is the measured velocity of the target device, $b_x$, $b_y$, are coordinates of the known location, f is a frequency of the waves, c is a wave propagation velocity between the known location and the target device, $\theta$ is the orientation of the target device and s is a normalized value of the signal, at the first time.

9. The method of claim 1, wherein applying the at least one contractor is not performed, if the velocity of the target device is less than a minimum velocity.

10. The method of claim 1, further comprising:
detecting additional waves at the target device, and
the at least one contractor is applied such that the contracted box meets constraints according to the phase of the detected acoustic waves and a second phase of a second signal corresponding to the detected additional waves.

11. The method of claim 10, wherein the additional waves are second acoustic waves having an additional-wave frequency which is different from a frequency of the acoustic waves.

12. The method of claim 10, wherein the additional waves are detected by another receiver placed at a different location than the receiver on the target device.

13. The method of claim 1, wherein the at least one contractor is applied such that the contracted box meets constraints according to a first phase of a first signal detected at a first location on the moving target device, and a second phase of a second signal detected at a second location on the moving target device.

14. The method of claim 1, wherein the velocity is measured using an odometer, a Doppler velocity log or a sonar.

15. The method of claim 1, wherein the orientation is measured using a compass, a magnetometer or an inertial measurement unit.

16. A method for tracking an underwater moving target device that detects signals due to acoustic waves generated at a known location, the method comprising:
obtaining attributes related to path and a signal received at the underwater moving target device, for a series of times; and
for each of the times, repeatedly contracting one or more location volumes that include a current location of the underwater moving target device, in a manner consistent with the obtained attributes.

17. The method of claim 16, wherein the signal related attributes include a phase of the signal.

18. The method of claim 16, wherein the path related attributes include a velocity of the underwater moving target device and an orientation of the underwater moving target device.

19. The method of claim 16, wherein the waves generated at the known location include first waves of a first frequency and second waves of a second frequency different from the first frequency, and
the signal related attributes include a first phase related to the first waves and a second phase related to the second waves.

20. An apparatus for estimating a location of an underwater moving target device carrying a receiver configured to detect acoustic waves emitted at a known location, the apparatus comprising:
an interface configured to receive information about a velocity of the underwater moving target device, an orientation of the underwater moving target device and a signal corresponding to the acoustic waves as detected at the underwater moving target device; and
a data processing unit connected to the interface and configured,
to generate one or more location boxes that include the location of the underwater moving target device,
for each of the location boxes, (A) to apply at least one contractor such that a contracted box meets constraints according to the velocity, the orientation and a phase of the signal, and, (B) if a width of the contracted box is less than a predetermined localizing precision, to place the contracted box in a stack of boxes, otherwise to split the contracted box into two location boxes and to place the two location boxes in the stack; and
to output the stack of boxes as an estimate of the location of the underwater moving target device.

* * * * *